United States Patent [19]

Makishima et al.

[11] 4,421,335

[45] Dec. 20, 1983

[54] CONTROL MECHANISM FOR A TRANSMISSION OF A FOUR-WHEEL DRIVE VEHICLE

[75] Inventors: Sadao Makishima, Akikawa; Seiichi Iwata, Mizuhomachi, both of Japan

[73] Assignee: Fuji Jukogyo Kabushiki Kaisha, Tokyo, Japan

[21] Appl. No.: 315,561

[22] Filed: Oct. 27, 1981

[30] Foreign Application Priority Data

Oct. 31, 1980 [JP] Japan ................................ 55-154415

[51] Int. Cl.³ .......................................... B60K 23/08
[52] U.S. Cl. .................. 280/247; 74/471 R; 74/473 R; 74/477
[58] Field of Search ......... 180/247; 74/471 R, 473 R, 74/476, 477

[56] References Cited

U.S. PATENT DOCUMENTS

| | | | | |
|---|---|---|---|---|
| 2,357,781 | 9/1944 | Randol | ................ | 192/3.5 |
| 3,106,851 | 10/1963 | Ivanchich | ................ | 74/335 |
| 4,022,079 | 5/1977 | Hidaka | ................ | 74/476 |
| 4,170,273 | 10/1979 | Kodama et al. | ................ | 180/233 |
| 4,241,621 | 12/1980 | Kodama | ................ | 180/247 |
| 4,290,318 | 9/1981 | Ookubo et al. | ................ | 180/247 |

Primary Examiner—Joseph F. Peters, Jr.
Assistant Examiner—Kenneth R. Rice
Attorney, Agent, or Firm—Martin A. Farber

[57] ABSTRACT

A control mechanism for a transmission apparatus for a four-wheel drive motor vehicle comprising an auxiliary change-speed transmission adapted to transmit power from the engine to a main transmission, a final reduction device for transmitting the output of the main transmission to the front axle and to the rear axle, a clutch connected to the final reduction device for transmitting the output of the main transmission for selectively connecting or disconnecting transmission of the output to one of the axles. An operation rod is longitudinally and slidably provided for swinging first and second guide plates. Each guide plate has a guide groove with which a part of a fork engages. By operating the operation rod, first and second guide plates are swung to cause the forks to shift with engagement with the guide grooves. The guide grooves are so arranged as to establish two-wheel high speed range driving, four-wheel high speed range driving and four-wheel low speed range driving.

17 Claims, 7 Drawing Figures

CONTROL MECHANISM FOR A TRANSMISSION OF A FOUR-WHEEL DRIVE VEHICLE

BACKGROUND OF THE INVENTION

The present invention relates to a control mechanism for a change-speed transmission of a four-wheel drive vehicle, and more particularly to a control mechanism comprising an auxiliary change-speed transmission having high and low gear ratios, a main change-speed transmission and a clutch device for connecting the output of the main change-speed transmission to front or rear wheels for the four-wheel drive operation, and having a single select lever for operating the auxiliary change-speed transmission and the clutch.

Such a control mechanism is disclosed in U.S. Pat. Nos. 4,170,273 and 4,241,621. The control mechanism is provided for a vehicle in which the engine, change-speed transmission and clutch device are longitudinally arranged. The present invention concerns a vehicle in which the engine and the main change-speed transmission are tranversely disposed in the front or rear of the vehicle, a final reduction gear for the front or the rear wheels is coupled to the transmission and a clutch device is provided for transmitting the power from the final reduction gear to the other wheels for the four-wheel drive operation.

In such a transmission system for a transversely disposed engine, an auxiliary change-speed transmission and the main change-speed transmission are transversely disposed on the vehicle.

Accordingly, a shifting device for the auxiliary change-speed transmission and a shifting device for the clutch device are operated in the transverse direction of the vehicle. Therefore, the well-known control mechanism for the above-mentioned longitudinal disposition, in which shifting devices are operated in the longitudinal direction of the vehicle, cannot be applied to the transversely disposed transmission.

SUMMARY OF THE INVENTION

The object of the present invention is to provide a control mechanism for transversely arranged change-speed transmission, in which an auxiliary change-speed transmissions and a clutch device are operated by longitudinal manual operation of a single select lever.

According to the present invention, there is provided a control mechanism for a transmission of a four-wheel drive vehicle, comprising a driving shaft adapted to be connected to the crankshaft of an engine by means of a first clutch, an auxiliary change-speed transmission provided adjacent to the driving shaft, an input shaft provided adjacent to the auxiliary change-speed transmission, the auxiliary change-speed transmission including reduction gear trains, an auxiliary clutch manually operable to select the transmitting ratios for transmitting the output of the driving shaft to the input shaft, and a first fork for shifting the auxiliary clutch means, an output shaft provided in parallel with the input shaft, a main change-speed transmission provided on the input shaft and the output shaft, means for transmitting the output of the output shaft to front axles and to rear axles, a third clutch provided in the means for transmitting the output of the output shaft for selectively connecting or disconnecting transmission of the output to either of the front or rear axles, a second fork for shifting the third clutch, an operation rod axially slidably provided for shifting the auxiliary clutch in the auxiliary change-speed transmission and for shifting the third clutch, a rotatably provided first guide plate for the first fork, a rotatably provided second guide plate for the second fork, the first and second guide plates being operatively connected to the operation rod, and each of the guide plates having a guiding groove slidably engaged with a part of the fork respectively, whereby the first and second forks may be selectively operatively shifted by moving the operation rod by means of the guide plates and the guide grooves.

The present invention will be more apparent from the following description of the preferred embodiment thereof with reference to the accompanying drawings.

DETAILED DESCRIPTION OF THE INVENTION

Figure 1:
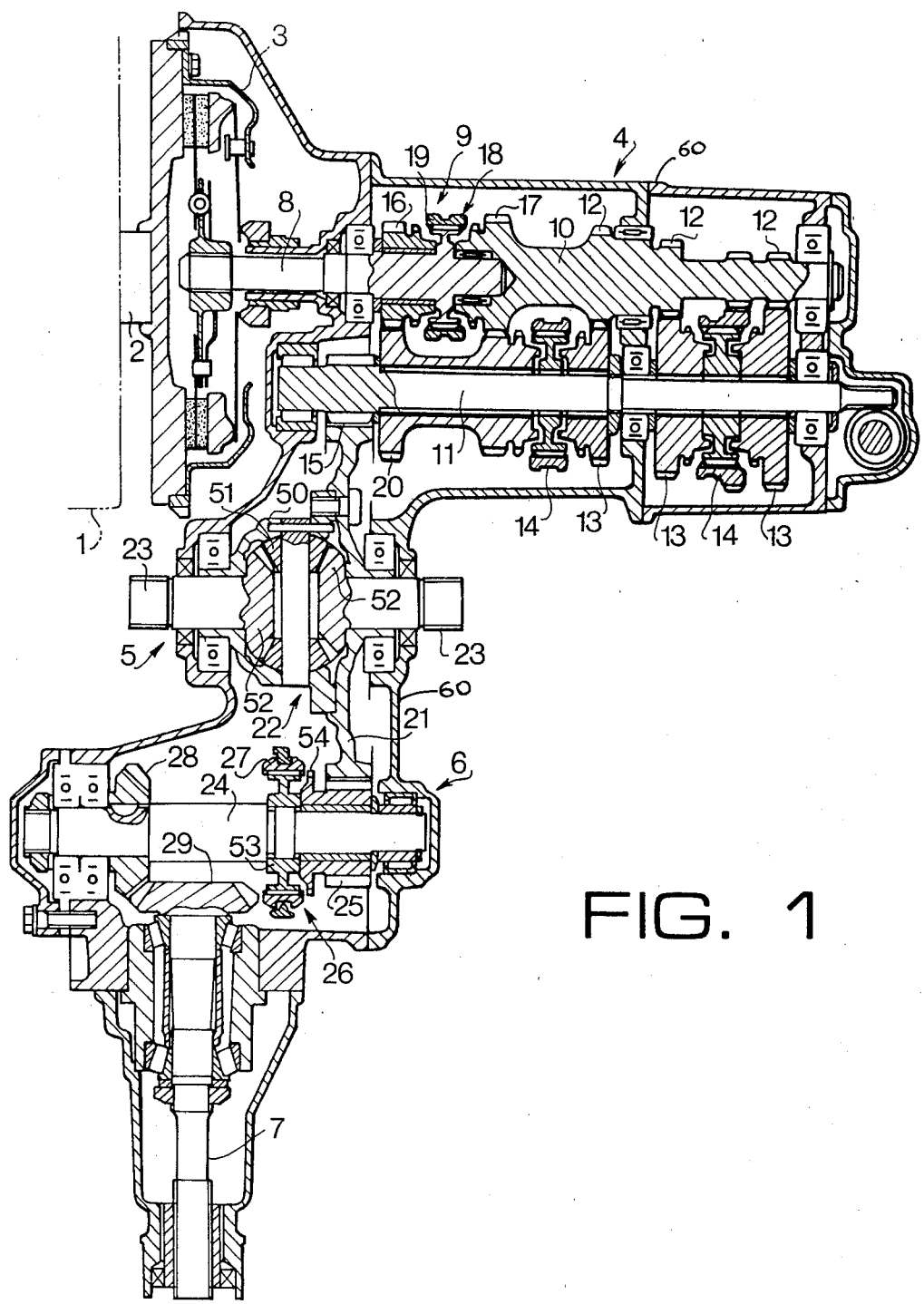
FIG. 1 is a cross-sectional view showing change-speed transmissions of a four-wheel drive vehicle, in which a control mechanism of the present invention is provided.

Referring to FIG. 1 showing a change-speed transmissions of four-wheel drive vehicle, an engine 1 is transversely mounted on a vehicle at a rear portion thereof. The change-speed transmissions comprise a main change-speed transmission 4 and an auxiliary change-speed transmission 9. A final reduction device 5 for rear wheels in disposed on the front side of the main change-speed transmission 4 and a transfer device 6 is further disposed on the front side of the final reduction device 5.

The auxiliary change-speed transmission 9 comprises a driving shaft 8 operatively connected to a crankshaft 2 of the engine 1 by means of a conventional clutch device 3 for engagement or disengagement thereof, a low drive gear 16 rotatably mounted on the driving shaft 8, a low driven gear 17 formed on an input shaft 10 of the main change-speed transmission 4, a synchromesh mechanism 18 having a sleeve 19, and a counter gear 20 rotatably mounted on an output shaft 11 of the main change-speed transmission 4. The main change-speed transmission 4 has four transmission ratios and comprises input shaft 10 provided with a plurality of drive gears 12, an output shaft 11, a plurality of driven gears 13 rotatably mounted on the output shaft 11 and engaged with the drive gears 12 respectively, two synchromesh mechanisms 14 mounted on the output shaft 11 for securing each driven gear 13 with the output shaft 11, and an output gear 15 secured to the output shaft 11. The synchromesh mechanism 18 in the auxiliary change-speed transmission 9 acts as a clutch for selectively engaging the driving shaft 8 with the input shaft 10 directly or by means of a reduction gear train comprising the gears 16, 20 and 17.

When the sleeve 19 of the synchromesh mechanism 18 is moved leftwards by manual operation, the driving shaft 8 is coupled with the low drive gear 16 through the synchromesh mechanism 18, so that power on the input shaft 8 is transmitted to the input shaft 10 by means of the gears 16, 20, 17 at a reduction ratio. When the sleeve 19 is moved rightwards to couple the driving shaft 8 directly with the low driven gear 17, power on the driving shaft 8 is directly transmitted to the input shaft 10. Thus, the power of the engine is transmitted to the input shaft 10 at a high or low speed by operating the auxiliary change-speed transmission 9. The rotational speed of the input shaft 10 is changed to four speeds by shifting gears of the main change-speed transmission 4. Thus, by operating both the auxiliary and the main transmissions 9 and 4, a four-speed transmission in a high speed range and another four-speed transmission in a low speed range are obtained. It will be noted that, in the illustrated embodiment, the low driven gear 17 and the counter gear 20 act also as drive-and-driven gears for transmission of the 4th-speed, which is the highest speed of the main change-speed transmission 4.

The final reduction device 5 comprises a final reduction gear 21 engaged with the output gear 15 on the output shaft 11. The final reduction gear 21 is secured to a differential case 50 of a differential 22. The differential comprises pinions 51 and side gears 52 each of which having an output shaft 23. Each output shaft 23 is connected operatively to a rear axle (not shown). The differential 22 is positioned mounted at the inner side of the final reduction gear 21.

The final reduction gear 21 engages with a gear 25 of the transfer device 6. The gear 25 is rotatably mounted on a shaft 24. The transfer device 6 comprises a clutch 26 which comprises a clutch hub 53 secured to the shaft 24 by splines, a sleeve 27 axially slidably engaged with the clutch hub 53 by splines, and splines 54 provided on a side of the gear 25. The sleeve 27 is shifted by a shift lever (not shown) for engaging splines of the sleeve 27 with the splines 54 so as to couple the gear 25 to the shaft 24. A bevel gear 28 is secured to the shaft 24 at the end of the shaft and engaged with a bevel gear 29 secured to a drive shaft 7 which is longitudinally disposed along the center line of the vehicle and connected operatively to front axles (not shown) for driving front wheels (not shown).

When the sleeve 19 of the auxiliary change-speed transmission 9 is moved rightwards to put the driving shaft 8 in direct connection with the main change-speed transmission, power in the high speed range is transmitted from the output gear 15 and transmitted to the final reduction device 5. If the sleeve 27 of the clutch 26 is moved leftwards to disengage the gear 25 from the shaft 24, the power is transmitted from the final reduction device 5 only to the rear wheels. Thus, only rear-wheel drive is established. On the other hand, when the sleeve 27 of the clutch 26 is moved rightwards to connect the gear 25 with the shaft 24, the power is also transmitted from the final reduction device 5 to the transfer device 6 and further to the front wheels by means of the drive shaft 7. Thus, high speed four-wheel drive is achieved.

When the sleeve 19 of the auxiliary change speed transmission 9 is moved to the left to connect the driving shaft 8 with the input shaft 10 by means of the low drive gear 16, the counter gear 20, and the low driven gear 17, the power from the output gear 15 of the main change-speed transmission 4 goes into the low speed range. Thus, the power is transmitted from the final reduction device 5 to the drive shaft 7 by means of the transfer device 6 to achieve low speed four-wheel drive.

Figure 2:
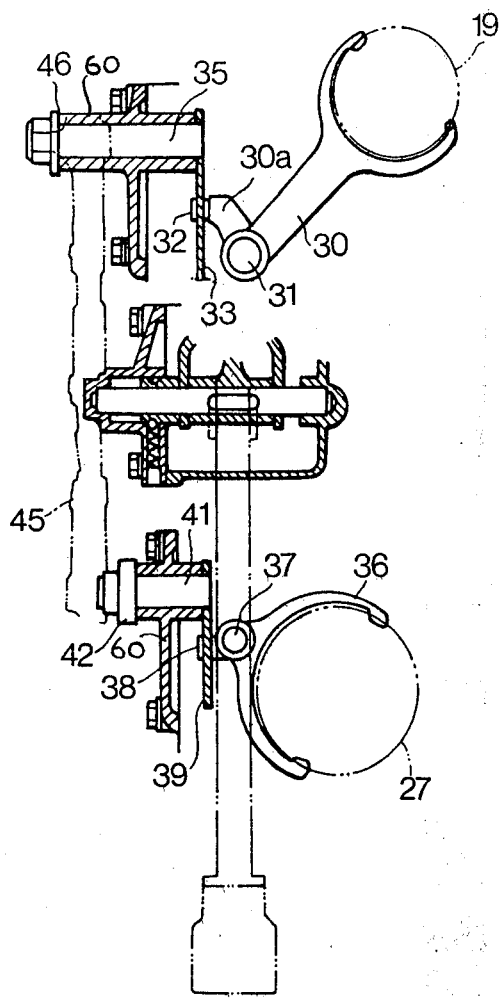
FIG. 2 is a cross-sectional view showing schematic shift mechanism in accordance with the present invention.
Figure 3:
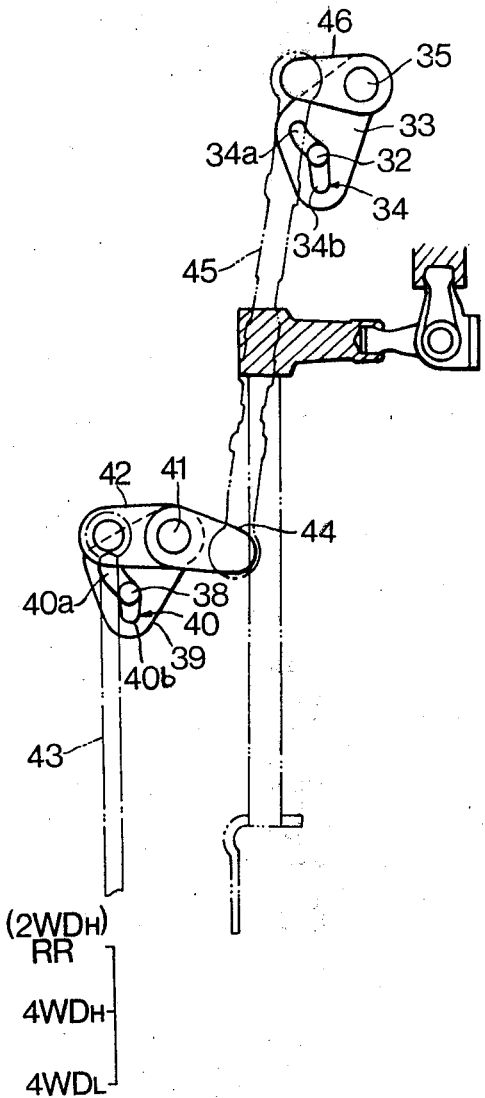
FIG. 3 is a schematic front view of the same.

Now, referring to FIGS. 2 to 4, the mechanism of the present invention will be explained hereinafter.

A fork 30 for moving the sleeve 19 of the synchromesh mechanism 18 in the auxiliary change-speed transmission 9 is slidably mounted on a shaft 31 disposed in the auxiliary change-speed transmission. A pin 32 provided on the arm 30a of the fork 30 slidably engages in a groove 34 formed in a guide plate 33 of fan shape. The guide plate 33 is secured to an end of a shaft 35 and is adapted to swing at a predetermined angle with the shaft 35, the latter being rotatably mounted in a casing 60 of the main change-speed transmission 4. The groove 34 comprises an arc portion 34a which corresponds to a part of a circle with a center at the shaft 35 and a straight portion 34b continuous from an end of the arc portion 34a at an angle therewith. When the pin 32 is in the arc portion 34a of the groove 34, the guide plate 33 swings idly, while when the pin 32 engages with the straight portion 34b, the guide plate 33 swings with movement of the pin 32 to shift the fork 30 and hence the sleeve 19.

Also in the clutch 26 of the transfer device 6, a fork 36 for shifting the sleeve 27 is slidably mounted on a shaft 37. In the vicinity of the shaft 37, a pin 38 is provided on the fork 36, which the pin engages with in a groove 40 formed in a fan-shaped guide plate 39. The guide plate 39 is secured to an end of a shaft 41 rotatably supported in the casing 60. The groove 40 also has an arc portion 40a and a straight portion 40b. The pin 38 engages with the straight portion 40b during one half of the swing angle of the guide plate 39, so that the sleeve 27 is shifted together with the fork 36 by the swinging of the guide plate 39. An operation rod 43 extending from a select lever (not shown) is coupled with the shaft 41, which is a part of the clutch operating means for the clutch 26, shaft 41 is connected to the shaft 35 of the auxiliary change-speed transmission 9 through a lever 44, a link 45 and a lever 46 to swing the guide plate 33 in a direction opposite to the swinging direction of the guide plate 39.

Figure 5:
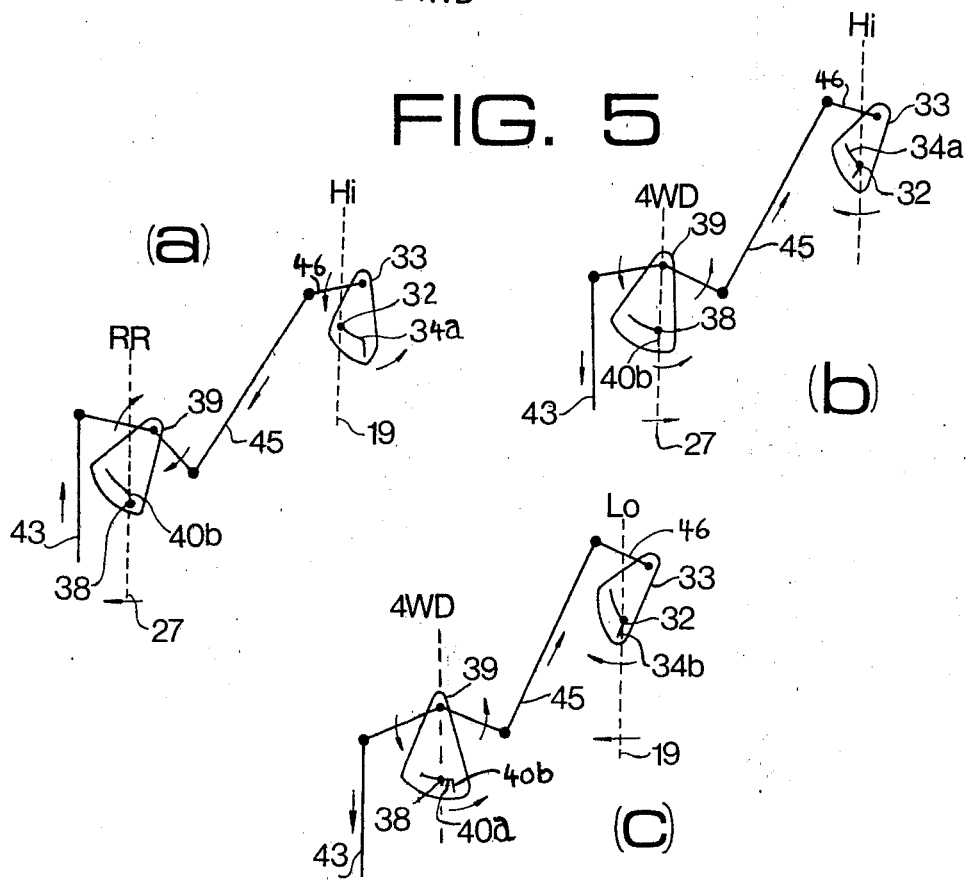
FIGS. 5a to 5c are schematic diagrams showing shifting operation.

FIG. 5 shows the operation of the mechanism of the present invention.

Figure 4:
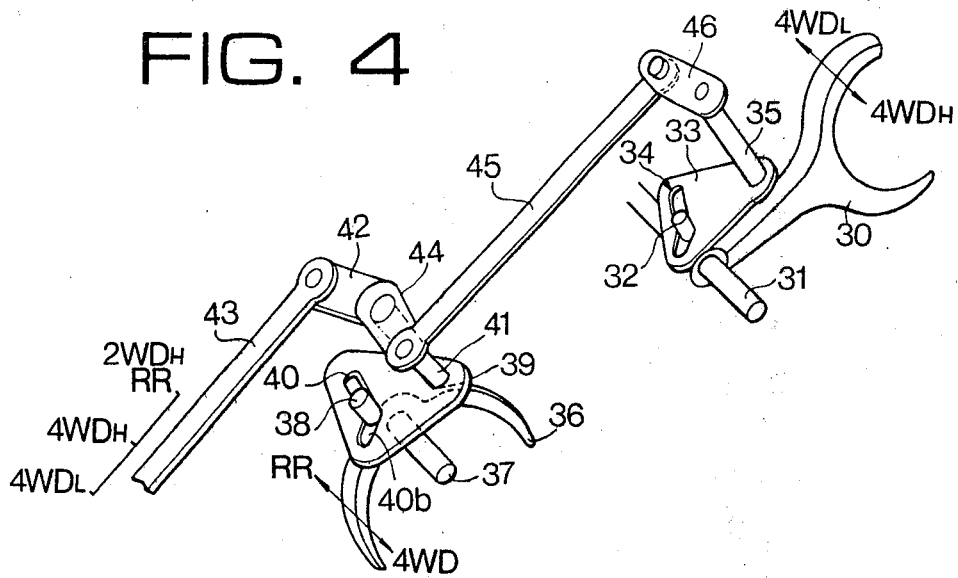
FIG. 4 is a perspective view of the same.

The operation rod 43 can be shifted by the select lever to three positions RR (abbreviation of "rear" drive with "rear"-mounted engine), 4WDH and 4WDL shown in FIG. 4, which are arranged relative of each other in the longitudinal direction of the vehicle. When the operation rod 43 is shifted to the foremost position RR from the 4WDH position as shown in FIG. 5(b) and FIG. 5(a), the guide plate 39 is rotated by the shaft 41 in the clockwise direction and the fork 36 is shifted to the left by the engagement of the pin 38 with the straight portion 40b. Thus, the clutch 26 is disengaged to provide two-wheel drive by rear wheels. On the other hand, because of such an operation, the guide plate 33 of the auxiliary change-speed transmission 9 is rotated with the shaft 35 in the counter-clockwise direction by means of the link 45 and the lever 46 to engage the pin 32 with the arc portion 34a. Thus, the sleeve 19 of the auxiliary change-speed transmission 9 is held in engagement with the input shaft 10. Therefore, the high-speed range driving by the rear wheels is established.

When the operation rod 43 is rearwardly shifted to the 4WDH position, the guide plate 39 of the clutch 26 is rotated in counter-clockwise direction as shown in FIG. 5(b) and the fork 36 and the sleeve 27 are shifted to the right with sliding of the pin 38 in the straight groove 40b. Thus, the clutch 26 is engaged to provide the four-wheel drive. On the other hand, the guide plate 33 swings in the clockwise direction and the pin 32 engages with the arc portion 34a. Thus, the high speed range of the auxiliary change-speed transmission 9 is maintained.

Further, when the operation rod 43 is moved rearwards to the 4WDL position as shown in FIG. 5(c), the guide plate 39 swings further in the counter-clockwise direction and the pin 38 leaves the straight portion 40b and engages with the arc portion 40a without shifting. Therefore, the guide plate 39 rotates idly to hold the clutch 26 in engagement condition. On the other hand, because the guide plate 33 of the auxiliary change-speed transmission 9 swings further in the clockwise direction, the pin 32 leave the arc portion 34a and goes into engagement with the straight portion 34b, causing the leftward movement of the fork 30 and the sleeve 19 thereby changing the auxiliary change-speed transmission 9 to the low speed range. Thus, the four-wheel drive in the low speed range is accomplished.

Similarly, when the operation rod 43 is shifted from the 4WDL position to the 4WDH position, the four-wheel drive in high speed range is provided.

Thus, in accordance with the present invention, even though the shifting mechanisms for the auxiliary change-speed transmission 9 and two-wheel/four-wheel driving changing clutch 26 are disposed in parallel operation arrangement, the select lever may be arranged to be operated along a straight line for the shifting mechanisms of both devices.

Accordingly, the operation of the select lever is very simple.

What is claimed is:

1. A control mechanism for a transmission of a four-wheel drive vehicle, comprising
a driving shaft adapted to be connected to a crankshaft of an engine through a first clutch means,
an auxiliary change-speed transmission provided adjacent to said driving shaft,
an input shaft of a main change-speed transmission provided adjacent to said auxiliary change-speed transmission,
said auxiliary change-speed transmission including reduction gear trains, a second clutch means manually operable for selecting transmission ratios of said auxiliary change-speed transmission for transmitting the output of said driving shaft to said input shaft, and a first fork means for shifting said second clutch means,
an output shaft provided in parallel with said input shaft, said main change-speed transmission provided on said input shaft and output shaft,
means for transmitting the output of said output shaft to front axles and to rear axles of the vehicle,
a third clutch means provided in said transmitting means for transmitting the output of said output shaft for selectively connecting and disconnecting, respectively, the transmitting of the output to either of the front or rear axles,
a second fork means for shifting said third clutch means,
an operation rod axially slidably provided for shifting said second clutch means in said auxiliary change-speed transmission and for shifting said third clutch means,
a rotatable first guide plate for said first fork means,
a rotatable second guide plate for said second fork means,
said first and second guide plates being operatively connected to said operation rod, each of said guide plates having a guide groove slidably engaged with a part of the corresponding said fork means, whereby by moving said operation rod said first and second fork means may be selectively shifted via said guide plates and said guide grooves.

2. The control mechanism for a transmission of a four-wheel drive vehicle in accordance with claim 1, wherein
said guide grooves of said guide plates are so arranged as to establish two-wheel high speed range driving, four-wheel high speed range driving, and four-wheel low speed range driving, respectively.

3. The control mechanism for a transmission of a four-wheel drive vehicle in accordance with claim 1, wherein
said guide groove of said guide plate comprises an arc portion with a center at a pivot of the guide plate and a straight portion.

4. The control mechanism for a transmission of a four-wheel drive vehicle in accordance with claim 1, wherein
said auxiliary change-speed transmission and said main change-speed transmission are transversely mounted on said vehicle.

5. The control mechanism for a transmission of a four-wheel drive vehicle in accordance with claim 1, wherein
said operation rod is disposed substantially along a longitudinal line of said vehicle.

6. A control mechanism for a transmission of a four wheel drive vehicle having an engine with a crankshaft, at least two axles for wheels operatively connected with said crankshaft of the engine, comprising
main change-speed transmission means for providing multi-stage gear ratios, said main change-speed transmission means being mounted on the vehicle in a transversely relative to a longitudinal direction of the vehicle,
a first clutch means for releasably connecting said main change-speed transmission means with said crankshaft of the engine,
said main change-speed transmission means including an auxiliary transmission comprising a second clutch means for selectively transmitting a high gear ratio and a low gear ratio, respectively, to an input shaft of said main change-speed transmission means;
final reduction means mounted about an axis which is oriented transversely relative to a longitudinal direction of the vehicle, said final reduction means for transmitting an output of said main change-speed transmission means to one of said at least two axles;
a transfer device having a portion mounted transversely relative to the longitudinal direction of the vehicle, and comprising a third clutch means for selectively operatively transmitting the output of said main change-speed transmission means to another of said at least two axles,
operating rod means, extending substantially in the longitudinal direction of the vehicle, for selectively operating said second clutch means and said third clutch means, and including first and second plates operatively connected to said second clutch means and said third clutch means, respectively so as to establish two wheel speed range driving, four-wheel high speed range driving, and four-wheel low speed range driving, respectively.

7. The control mechanism for a transmission of a four-wheel drive vehicle in accordance with claim 6, wherein
said operating rod means further comprises,
a link means operatively pivotally connects said first and said second plates,
an operating rod is operatively pivotally connected to said link means,
said first and second plates are pivotally mounted so as to pivot upon shifting movement of said operating rod so as to selectably actuate said second clutch means and said third clutch means, respectively.

8. The control mechanism for a transmission of a four-wheel drive vehicle in accordance with claim 7, wherein
pivot shafts are pivotally mounted in a casing,
said plates are rigidly connected to said pivot shafts, respectively,
said plates are each formed with a groove having an arc portion of a circle with an origin at the corresponding said shaft and having another portion having a shape different from an arc portion of the circle with an origin at the corresponding shaft,
forks each having a pin, said pins are slidably disposed in said grooves of said plates, respectively, said forks are connected to said second clutch means and said third clutch means, respectively, said forks constituting the operative connection of said first and second plates to said second clutch means and said third clutch means, respectively.

9. The control mechanism for a transmission of a four-wheel drive vehicle in accordance with claim 8, wherein
said operating rod means further comprises,
a first lever secured to one of said pivot shafts,
a second lever secured to the other of said pivot shafts,
said operating rod operatively pivotally connected to said link means via said second lever, and
said link means pivotally connected to both of said levers constituting the operative pivotal connection of said link means to said first and second plates.

10. The control mechanism for a transmission of a four-wheel drive vehicle in accordance with claim 9, wherein
said second lever and said other pivot shaft constitute members,
said operating rod means further comprises,
a third lever rigidly connected to one of said members and is pivotally connected to said operating rod.

11. The control mechanism for a transmission of a four-wheel drive vehicle in accordance with claim 9, wherein
said pivot shafts are parallel and said grooves are substantially in parallel to each other and of substantially the same formation,
said second lever constitutes a double armed lever pivotally mounted at said other pivot shaft,
one of the arms of said second lever is pivotally connected to said link means and said other arm is pivotally connected to said operating rod,
said first lever is a one arm lever pivotally mounted at said one pivot shaft.

12. The control mechanism for a transmission of a four-wheel drive vehicle in accordance with claim 11, wherein
said operating rod extends in the longitudinal direction of the vehicle and is longitudinally shiftable,
said four-wheel high speed range driving corresponds to a longitudinal position of said operating rod located between positions of said operating rod corresponding to said four-wheel low speed driving and said two wheel speed range driving, and
said pins are disposed in said grooves between said arc portion and said another portion in said position of said operating rod corresponding to said four-wheel high speed range driving.

13. The control mechanism for a transmission of a four-wheel drive vehicle in accordance with claim 12, wherein
said first plate is rigidly connected to said one pivot shaft and said second plate is rigidly connected to said other pivot shaft.

14. The control mechanism for a transmission of a four-wheel drive vehicle in accordance with claim 8, wherein
said second clutch means and a corresponding of said forks are axially jointly movable transversely relative to the longitudinal direction of the vehicle,
said third clutch means and the other of said forks are axially jointly movable transversely relative to the longitudinal direction of the vehicle.

15. The control mechanism for a transmission of a four-wheel drive vehicle in accordance with claim 14, further comprising
parallel shafts transversely disposed in the vehicle,
said forks are slidably mounted on said parallel shafts.

16. The control mechanism for a transmission of a four-wheel drive vehicle in accordance with claim 8, wherein
said link means being connected to said plates such that said first and second plates pivot in an opposite direction, respectively, upon shifting movement of said operating rod so as to selectably actuate said second clutch means and said third clutch means, respectively.

17. The control mechanism for a transmission of a four-wheel drive vehicle in accordance with claim 13, wherein
said pivot shafts of said plates, respectively, are located at corresponding ends of each of said plates, respectively,
said one of said arms of said second lever extends from said other pivot shaft in a direction opposite the extending of said first lever from said one pivot shaft.

* * * * *